United States Patent
Udagawa et al.

(10) Patent No.: US 7,220,799 B2
(45) Date of Patent: May 22, 2007

(54) RADIATION-MODIFIED POLY(TETRAFLUOROETHYLENE) RESIN FEEDS AND A PROCESS FOR PRODUCING THE SAME

(75) Inventors: Akira Udagawa, Takasaki (JP); Akihiro Oshima, Takasaki (JP)

(73) Assignee: Japan Atomic Energy Research Institute, Tokyo (JP)

( * ) Notice: Subject to any disclaimer, the term of this patent is extended or adjusted under 35 U.S.C. 154(b) by 140 days.

(21) Appl. No.: 10/855,573

(22) Filed: May 28, 2004

(65) Prior Publication Data
US 2004/0220294 A1 Nov. 4, 2004

Related U.S. Application Data

(62) Division of application No. 10/081,533, filed on Feb. 25, 2002, now Pat. No. 6,762,215.

(30) Foreign Application Priority Data
Feb. 28, 2001 (JP) ............................. 2001-053495

(51) Int. Cl.
  C08L 27/18 (2006.01)
  C08F 14/18 (2006.01)
  C08J 3/28 (2006.01)
(52) U.S. Cl. .............. 525/199; 526/250; 522/155; 522/156; 264/331.14
(58) Field of Classification Search ............ 522/156, 522/155; 525/199; 526/250
See application file for complete search history.

(56) References Cited

U.S. PATENT DOCUMENTS

| 3,766,031 | A | | 10/1973 | Dillon |
| RE28,628 | E | * | 11/1975 | Carlson et al. ............. 522/155 |
| 4,036,718 | A | | 7/1977 | Brown et al. |
| 4,110,186 | A | * | 8/1978 | Arkles et al. ............... 522/156 |
| 4,220,511 | A | | 9/1980 | Derbyshire |
| 4,624,990 | A | * | 11/1986 | Lunk et al. ................. 525/199 |
| 5,444,103 | A | | 8/1995 | Tabata et al. |
| 5,603,999 | A | * | 2/1997 | Namura et al. .......... 428/36.92 |
| 5,916,929 | A | | 6/1999 | Knobel et al. |
| 6,555,648 | B1 | * | 4/2003 | Hinds .......................... 528/481 |
| 6,762,215 | B2 | * | 7/2004 | Udagawa et al. ........... 522/156 |

FOREIGN PATENT DOCUMENTS

JP 2001329069 A 11/2001

OTHER PUBLICATIONS

21 CFR § 179.26 (Apr. 1, 2004 Edition).
W.T. Roberts, MS & Jean Olds Weese, Ph.D.; "Food Irradiation"; http://www.aces.edu/dept/family/foodsafe/irrad.htm, pp. 1-5.

* cited by examiner

Primary Examiner—Susan Berman

(57) ABSTRACT

Unsintered poly(tetrafluoroethylene) resin feeds are treated with ionizing radiation in an absorbed dose of no more than 1,000 Gy at room temperature in air so that only the melting temperature of the resin feeds is shifted toward the lower end without changing the quantities of heat of fusion and crystallization.

3 Claims, 1 Drawing Sheet

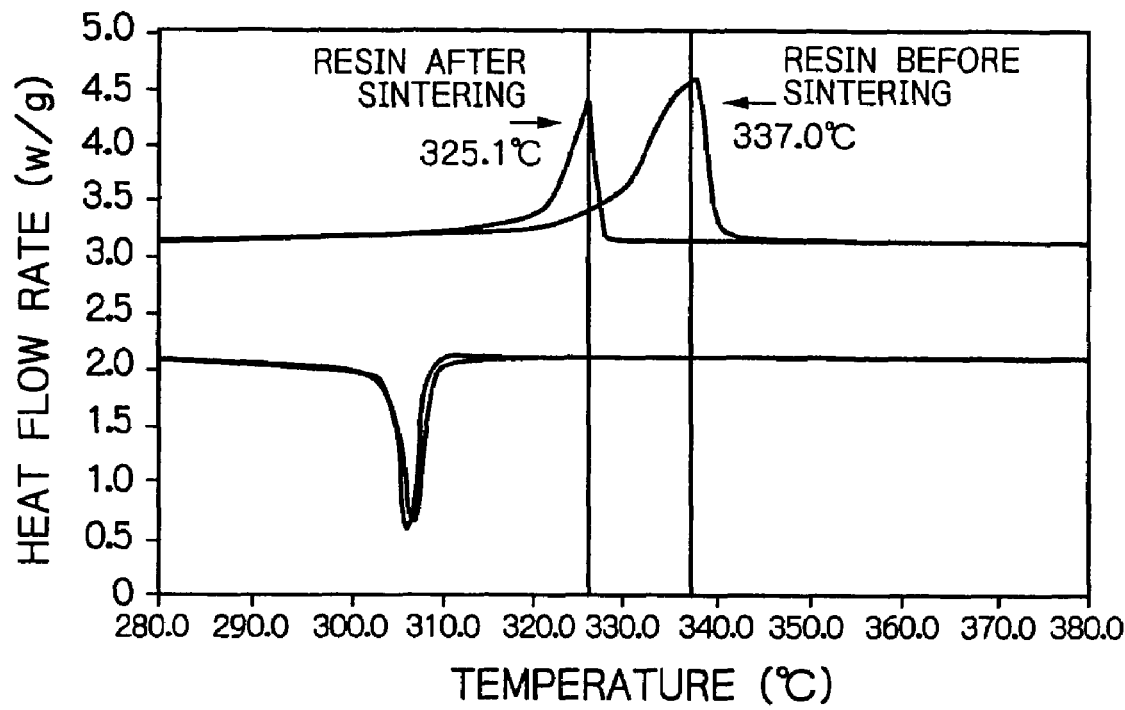
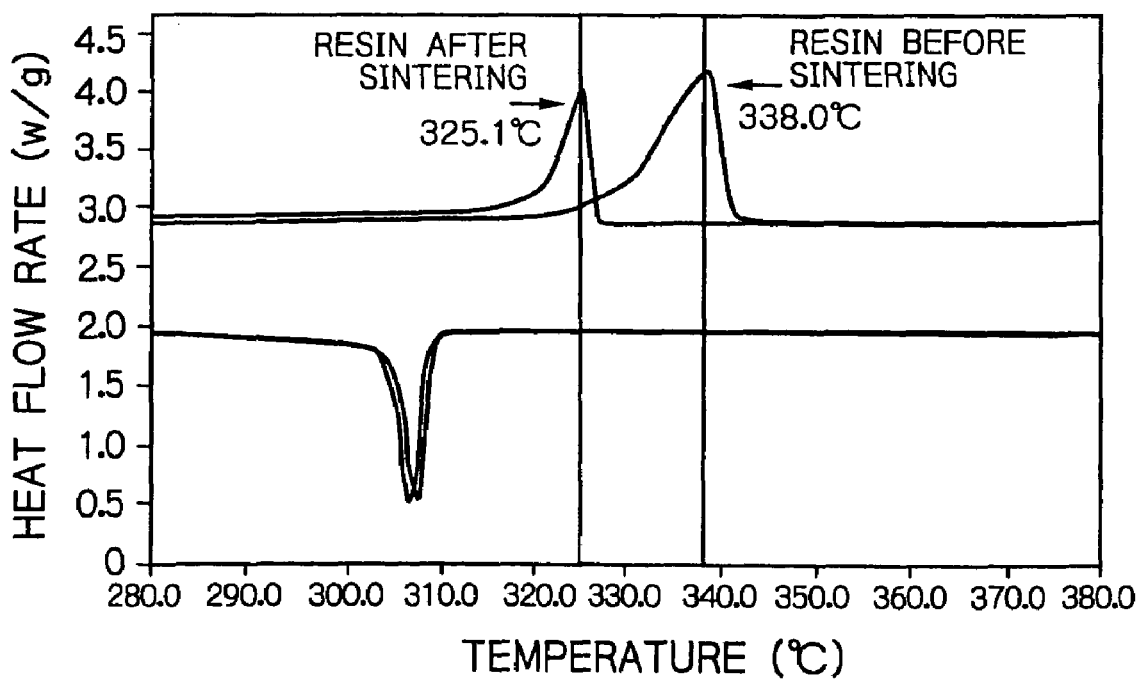

RADIATION-MODIFIED POLY (TETRAFLUOROETHYLENE) RESIN FEEDS AND A PROCESS FOR PRODUCING THE SAME

This application claims the benefit under 35 U.S.C. § 120 of prior filed U.S. application Ser. No. 10/081,533, filed Feb. 25, 2002, which claims priority to Japanese Patent Application No. 053495/2001 filed in Japan on Feb. 28, 2001.

BACKGROUND OF THE INVENTION

This invention relates to an improvement of thermal properties of poly(tetrafluoroethylene) resin feeds by ionizing radiations. More particularly, the invention relates to a process for producing radiation-modified poly(tetrafluoroethylene) resin feeds by applying ionizing radiations to unsintered poly(tetrafluoroethylene) resins under mild conditions so that only their melting temperature is shifted to the lower end without changing the quantities of heat of fusion and crystallization. The thus modified poly(tetrafluoroethylene) resin feeds are characterized in that their moldings have the same melting temperature, heat of fusion, crystallization temperature and heat of crystallization as the moldings of the unirradiated poly(tetrafluoroethylene) resin feeds. The invention also relates to the radiation-modified poly(tetrafluoroethylene) resin feeds produced by the process.

Poly(tetrafluoroethylene) resins are engineering plastics having high resistance to heat, chemicals and friction, high water repellency, good lubricating property and high electrical insulation. Because of these features, poly(tetrafluoroethylene) resins have heretofore been used in various industrial and consumer applications including electric wire coatings, tubes, pipes, packings, gaskets, linings, insulation tape, bearings and roofing membranes for air domes.

However, unlike the other polymeric materials, poly(tetrafluoroethylene) resins are seldom molded into various shapes on their own. For the very reason that they have high heat and chemical resistance, poly(tetrafluoroethylene) resins are difficult to shape by heating or dissolving in solvents.

With a view to improving the moldability of poly(tetrafluoroethylene) resins, it has been attempted to modify them by partial replacement of the tetrafluoroethylene molecules with a copolymerizable component. However, the introduced copolymerizable component not only causes substantial changes in thermal properties, such as the quantities of heat of fusion and crystallization, of the poly(tetrafluoroethylene) resins but also impairs their purity, thus causing deterioration in various characteristics of their moldings.

Of the various polymeric materials known today, poly(tetrafluoroethylene) resins are the easiest to deteriorate upon radiation exposure and the mechanical characteristics of their moldings decrease with absorbed dose whereas the quantities of heat of fusion and crystallization increase as more molecular chains are severed. Needless to say, poly(tetrafluoroethylene) resins in bulk powder form have substantially the same sensitivity to radiation as when they are shaped into moldings; following the exposure to radiation, the quantities of heat of fusion and crystallization increase as more molecular chains are severed and the mechanical characteristics of shapes molded from the irradiated poly(tetrafluoroethylene) resins are also inferior to those of the unirradiated resins. These effects of radiations are currently used to prepare a wax of poly(tetrafluoroethylene) resins by decomposing them.

It has recently been shown that poly(tetrafluoroethylene) resins are crosslinked by applying ionizing radiation in a special environment, i.e. at elevated temperature in the absence of oxygen. The crosslinked resins have higher heat resistance but, on the other hand, their moldability is impaired.

SUMMARY OF THE INVENTION

It is, therefore, the principal object of the invention to improve the moldability of poly(tetrafluoroethylene) resins by the simple means of applying radiation such that their purity is retained and that only their melting temperature is shifted toward the lower end without changing the quantities of heat of fusion and crystallization from those of unsintered poly(tetrafluoroethylene) resins.

More specifically, the invention provides radiation-modified poly(tetrafluoroethylene) resins which are characterized in that their moldings have the same melting temperature, heat of fusion, crystallization temperature and heat of crystallization as the moldings of the unirradiated poly(tetrafluoroethylene) resin feeds. The invention also provides a process for producing such radiation-modified poly(tetrafluoroethylene) resin.

In order to attain the stated object, the present inventors applied ionizing radiations to unsintered poly(tetrafluoroethylene) resins in bulk powder form under various conditions and made a close study of the relationship between the exposure conditions and each of the thermal properties, such as melting temperature, heat of fusion, crystallization temperature and heat of crystallization, of the resins both before and after shaping. As a result of their intensive studies, the inventors found the following new fact: when unsintered poly(tetrafluoroethylene) resin feeds were exposed to ionizing radiation in an absorbed dose of no more than 1,000 Gy at room temperature in air, only their melting temperature was shifted toward the lower end without changing the quantities of their heat of fusion and crystallization, whereby their moldability was improved; in addition, the moldings of the irradiated resin feeds had identical values of thermal properties, such as melting temperature, heat of fusion, crystallization temperature and heat of crystallization, to those of the moldings prepared from the unirradiated resin feeds. The present invention has been accomplished on the basis of this finding.

The present inventors previously invented a method in which poly(tetrafluoroethylene) resins were exposed to ionizing radiation, thereby producing radiation-modified poly(tetrafluoroethylene) resins having increased tear strength and an application for obtaining patent on this invention was already filed (Japanese Patent Application No. 2000-155902). The present invention provides a very effective method of using radiations in that the moldability of poly(tetrafluoroethylene) resin feeds could be improved by only shifting the melting temperature of unsintered resin feeds toward the lower end without affecting the thermal properties of the moldings to be prepared.

BRIEF DESCRIPTION OF THE DRAWINGS

FIG. 1 is a graph showing the result of DSC (differential scanning calorimetry) conducted to measure thermal properties of 500-Gy irradiated poly(tetrafluoroethylene) in bulk power form in a temperature range of 270–390° C. with the temperature rising at a rate of 10° C./min; and FIG. 2 is a graph showing the result of DSC conducted to measure thermal properties of a comparative sample [unirradiated poly(tetrafluoroethylene) resin feed in bulk powder form] in a temperature range of 270–390° C. with the temperature rising at a rate of 10° C./min.

DETAILED DESCRIPTION OF THE INVENTION

In the invention, a poly(tetrafluoroethylene) resin feed is treated by an ionizing radiation. To be more specific, a dried powder of poly(tetrafluoroethylene) resin or a liquid called "dispersion" in which a powder of poly(tetrafluoroethylene) resin is dispersed uniformly is treated by an ionizing radiation to give an absorbed dose of 1–1,000 Gy in a temperature range of −30~50° C. near ordinary or room temperature, preferably not higher than 19° C., and in air.

The term "poly(tetrafluoroethylene) resin feed" as used herein means dried powders of poly(tetrafluoroethylene) resins obtained by emulsion polymerization or suspension polymerization, said powders being optionally granulated or dispersed uniformly in solvents or wetted with solvents. The powders or dispersions of poly(tetrafluoroethylene) resins need not be entirely treated with ionizing radiation and the intended advantages and object of the invention can be attained even if said powders or dispersions are mixed in suitable proportions with the powders or dispersions of unirradiated poly(tetrafluoroethylene) resins.

The dispersion medium, or the liquid in which the powders of poly(tetrafluoroethylene) resin feeds can be dispersed efficiently, may be exemplified by mixed solvents such as those consisting of water/emulsifier, water/alcohol, water/acetone, and water/alcohol/acetone; suitable dispersion media can be easily selected or prepared by skilled engineers in the art who are familiar with dispersion media.

The emulsifier may be exemplified by an aqueous colloidal suspension of PTFE which has a nonionic surfactant such as NISSAN NONION HS208 (trademark) or an anionic surfactant added in a few percent to the resin, or a dispersion having an aqueous solution of phosphoric acid or chromic acid added to the aqueous colloidal suspension of PTFE in order to provide ease in a subsequent step of bonding the resin film to a metal substrate by stoving.

The ionizing radiation to be used in the invention may be exemplified by electron beams, x-rays, γ-rays, neutron beams and high-energy ions which may be used either alone or in admixture. The dose rate, or the amount of radiation applied per unit time, may be of any suitable values that can be easily chosen by skilled engineers in the art.

The purpose of the invention can be easily attained by treating the poly(tetrafluoroethylene) resin feed with ionizing radiation in air. If desired, a certain kind of reactive gas or inert gas may intentionally be added to air to create a special atmosphere so that a specified function or property is conferred to the radiation-modified poly(tetrafluoroethylene) resin or that a property such as water repellency the poly(tetrafluoroethylene) initially possess is attenuated; this practice is also included in the scopey of the invention. Therefore, the term "air" as defined herein covers not only the ordinary air in the atmosphere but also atmospheres created intentionally as described above by adjusting or modifying the composition of the ordinary atmospheric air.

The following examples are provided for the purpose of further illustrating the present invention but are in no way to be taken as limiting.

EXAMPLE 1

A commercial fine powder of poly(tetrafluoroethylene) resin prepared by emulsion polymerization (CD 090 of Asahi Glass Fluoropolymers Co., Ltd.) was used as a resin feed and put into paper envelopes. The respective samples were irradiated with γ-rays for 0.5, 2.5 and 5 hours at a dose rate of 200 Gy/h in air at room temperature, thus producing feed powders treated with γ-rays to absorbed doses of 100, 500 and 1,000 Gy.

Differential scanning calorimetry (DSC) provides a simple tool for examining thermal properties of the poly(tetrafluoroethylene) resin both before sintering (in an unirradiated state) and after molding (in an irradiated state). The first run of scan with temperature elevation simulates thermal properties after polymerization reaction whereas the second run of scan with temperature elevation simulates thermal properties after molding.

Thermal properties of the feed powder irradiated with 500 Gy of γ-rays were measured by DSC in a temperature range of 270–390° C. with the temperature rising at a rate of 10° C./min and the result is shown in FIG. 1. For comparison, the same measurement was made on an unirradiated poly(tetrafluoroethylene) resin powder and the result is shown in FIG. 2. The feed powders treated with γ-rays to absorbed doses of 100, 500 and 1,000 Gy were subjected to the first and second runs of DSC and the melting temperature and the quantity of heat of fusion were measured for each sample; the results are shown in Table 1.

In the first run of DSC, the irradiated feed powders exhibited lower melting temperatures than the unirradiated sample but there was little change in the quantity of heat of fusion. In the second run of DSC, there were no changes in thermal properties and all samples including the comparative sample had the same data.

The term "heat flow rate" on the vertical axes of FIGS. 1 and 2 represents a heat balance in thermal analysis by DSC, or the heat input to or output from the resin sample as it is heated or cooled with the temperature rising or falling at a constant rate. The term "resin before sintering" refers to the case of using an unsintered shape as green PTFE and the term "resin after sintering" refers to the case of using a shape as a plastic after it is sintered, i.e. heat treated at the melting point or above.

TABLE 1

Results of Analysis by DSC of Feed Powders for Different Doses of Gamma-Rays

| | First run | | Second run | |
|---|---|---|---|---|
| | Melting temperature | Heat of fusion | Melting temperature | Heat of fusion |
| Unirradiated | 338.1 | 68.5 | 325.1 | 30.1 |
| 100 Gy | 337.7 | 68.1 | 325.3 | 30.8 |
| 500 Gy | 337.0 | 66.7 | 325.1 | 30.2 |
| 1000 Gy | 336.4 | 67.5 | 325.8 | 30.1 |

EXAMPLE 2

A commercial molding powder of poly(tetrafluoroethylene) resin prepared by suspension polymerization (G 163 of Asahi Glass Fluoropolymers Co., Ltd.) was used as a resin feed and put into paper envelopes. The respective samples were irradiated with γ-rays for 1, 3 and 5 hours at a dose rate of 100 Gy/h in air at room temperature, thus producing feed powders treated with γ-rays to absorbed doses of 100, 300 and 500 Gy.

The feed powders treated with γ-rays to absorbed doses of 100, 300 and 500 Gy were subjected to the first and second runs of DSC in a temperature range of 270–390° C. with the temperature rising at a rate of 10° C./min and the melting temperature and the quantity of heat of fusion were measured for each sample; the results are shown in Table 2.

In the first run of DSC, the irradiated feed powders exhibited lower melting temperatures than the unirradiated sample but there was little change in the quantity of heat of fusion. In the second run of DSC, there were no changes in thermal properties and all samples including the comparative sample had the same data.

TABLE 2

Results of Analysis by DSC of Feed Powders for Different Doses of Gamma-Rays

|  | First run | | Second run | |
| --- | --- | --- | --- | --- |
|  | Melting temperature | Heat of fusion | Melting temperature | Heat of fusion |
| Unirradiated | 342.6 | 63.7 | 325.6 | 21.3 |
| 100 Gy | 338.4 | 62.4 | 325.9 | 21.7 |
| 300 Gy | 337.0 | 63.2 | 326.1 | 22.2 |
| 500 Gy | 335.9 | 62.0 | 325.8 | 22.1 |

EXAMPLE 3

A commercial molding powder of poly(tetrafluoroethylene) resin prepared by suspension polymerization (G 350 of Asahi Glass Fluoropolymers Co., Ltd.) was used as a resin feed and put into paper envelopes. The respective samples were irradiated with γ-rays for 12, 30 and 60 minutes at a dose rate of 1,000 Gy/h in air at room temperature, thus producing feed powders treated with α-rays to absorbed doses of 200, 500 and 1,000 Gy.

The feed powders treated with γ-rays to absorbed doses of 200, 500 and 1,000 Gy were subjected to the first and second runs of DSC in a temperature range of 270–390° C. with the temperature rising at a rate of 10° C./min and the melting temperature and the quantity of heat of fusion were measured for each sample; the results are shown in Table 3.

In the first run of DSC, the irradiated feed powders exhibited lower melting temperatures than the unirradiated sample but there was little change in the quantity of heat of fusion. In the second run of DSC, there were no changes in thermal properties and all samples including the comparative sample had the same data.

TABLE 3

Results of Analysis by DSC of Feed Powders for Different Doses of Gamma-Rays

|  | First run | | Second run | |
| --- | --- | --- | --- | --- |
|  | Melting temperature | Heat of fusion | Melting temperature | Heat of fusion |
| Unirradiated | 342.7 | 63.4 | 325.8 | 22.1 |
| 200 Gy | 339.6 | 60.8 | 325.8 | 21.9 |
| 500 Gy | 338.0 | 62.7 | 325.8 | 22.4 |
| 1000 Gy | 337.3 | 62.3 | 325.4 | 23.1 |

EXAMPLE 4

The powder irradiated with 1000 Gy of γ-rays in Example 3 was mixed uniformly at a ratio of 1:1 with an unirradiated powder of G 350 at a temperature of 15° C. to prepare a feed powder. Thermal properties of the feed powder were measured by DSC in a temperature range of 270–390° C. with the temperature rising at a rate of 10° C./min were. The feed powder was subjected to the first and second runs of DSC and the melting temperature and the quantity of heat of fusion were measured; the results are shown in Table 4.

TABLE 4

Results of Analysis by DSC of Feed Powders

|  | First run | | Second run | |
| --- | --- | --- | --- | --- |
|  | Melting temperature | Heat of fusion | Melting temperature | Heat of fusion |
| Unirradiated | 342.7 | 63.4 | 325.8 | 22.2 |
| 1:1 Mixture | 338.2 | 63.8 | 325.6 | 22.5 |

If poly(tetrafluoroethylene) resin feeds after polymerization reaction but before sintering are treated with ionizing radiation by the method of the invention, only their melting temperature is shifted toward the lower end without changing the quantities of their heat of fusion and crystallization. As a result, the moldability of the feeds is so much improved that the moldings prepared from them are the same as those from the unirradiated resin feeds not only in the melting temperature and the quantity of heat of fusion but also in the crystallization temperature and the quantity of heat of crystallization. In addition, the improved moldability of the poly(tetrafluoroethylene) resins is anticipated to bring out new properties. What is more, the invention does not rely upon chemical means of modification such as copolymerization and the inherent good properties of the poly(tetrafluoroethylene) resins remain intact; this will help further expand the scope of their utility.

What is claimed is:

1. A radiation-modified poly(tetrafluoroethylene) resin feed which has been irradiated with an ionizing radiation in an absorbed dose of no more than 1,000 Gy at a temperature between −30 and 50° C. in air, wherein the melting temperature of the irradiated poly(tetrafiuoroethylene) resin is lower than the melting temperature of the same unirradiated poly(tetrafluoroethylene) resin and wherein the quantities of heat of fusion and heat of crystallization of the irradiated poly(tetrafluoroethylene) resin do not change compared to those of the same unirradiated poly(tetrafluoroethylene) resin.

2. The radiation-modified poly(tetrafluoroethylene) resin feed according to claim 1, wherein a molding prepared from said resin feed is the same as a molding from an unirradiated resin feed not only in the melting temperature and the quantity of heat of fusion but also in the crystallization temperature and the quantity of heat of crystallization, the unirradiated resin feed being the same poly(tetrafluoroethylene) resin that has been irradiated.

3. A molding resin feed composition comprising the radiation-modified poly(tetrafiuoroethylene) resin feed according to claim 1 and unirradiated powder of poly (tetrafluoroethylene) resin or a radiation-crosslinked poly (tetrafiuoroethylene) resin.

* * * * *

UNITED STATES PATENT AND TRADEMARK OFFICE
CERTIFICATE OF CORRECTION

PATENT NO.       : 7,220,799 B2                                    Page 1 of 1
APPLICATION NO.  : 10/855573
DATED            : May 22, 2007
INVENTOR(S)      : Akira Udagawa et al.

It is certified that error appears in the above-identified patent and that said Letters Patent is hereby corrected as shown below:

Column 6, Line 45, change "(tetrafiuoroethylene)" to --(tetrafluoroethylene)--.

Column 6, Line 62, change "(tetrafiuoroethylene)" to --(tetrafluoroethylene)--.

Column 6, Line 65, change "(tetrafiuoroethylene)" to --(tetrafluoroethylene)--.

Signed and Sealed this

Eighth Day of April, 2008

JON W. DUDAS
*Director of the United States Patent and Trademark Office*